United States Patent [19]

Cannady, Jr. et al.

[11] 4,006,048
[45] Feb. 1, 1977

[54] REVERSE PRINTED HIGH-PRESSURE LAMINATES

[75] Inventors: Daniel L. Cannady, Jr., Allendale, S.C.; Salvatore E. Palazzolo, Elizabeth City, N.C.

[73] Assignee: Westinghouse Electric Corporation, Pittsburgh, Pa.

[22] Filed: Aug. 14, 1975

[21] Appl. No.: 604,749

[52] U.S. Cl. .................. 156/90; 156/219; 156/220; 156/277; 156/288; 156/331; 156/335; 260/32.6 N; 260/33.2 EP; 260/51 R; 260/67.6 R; 428/203; 428/211; 428/531

[51] Int. Cl.² .................. B32B 33/00

[58] Field of Search ........... 156/288, 277, 90, 331, 156/335, 219, 220; 428/203, 204, 211, 530, 531; 260/67.6 R, 47 R, 51 R, 32.6 N, 33.2 EP

[56] References Cited
UNITED STATES PATENTS

| | | | |
|---|---|---|---|
| 2,773,788 | 12/1956 | Magrane et al. | 428/530 |
| 2,816,851 | 12/1957 | Arledter | 428/211 |
| 3,208,901 | 9/1965 | Kelley et al. | 428/211 |
| 3,458,391 | 7/1969 | Miller | 428/530 |
| 3,484,334 | 12/1969 | Wakayoshi et al. | 428/211 |
| 3,547,767 | 12/1970 | Keeling et al. | 428/211 |

*Primary Examiner*—Edward G. Whitby
*Attorney, Agent, or Firm*—D. P. Cillo

[57] ABSTRACT

A patterned, decorative laminate is made by: (1) preparing a core layer, comprising a plurality of fibrous sheets impregnated with a resinous material, (2) placing on top of the core, at least one unfilled kraft paper barrier sheet, impregnated with at least 30 weight percent of an aminotriazine-aldehyde, urea-aldehyde, thiourea-aldehyde or unsaturated polyester resin, (3) placing on top of the impregnated barrier sheet, an unfilled protective sheet, impregnated with an aminotriazine-aldehyde, urea-aldehyde, thiourea-aldehyde or unsaturated polyester resin; the protective sheet having a design printed on the bottom surface facing the barrier sheet, the design covered with colored pigmented material, and (4) heat and pressure consolidating the sheets into a unitary, bonded laminate.

10 Claims, 5 Drawing Figures

REVERSE PRINTED HIGH-PRESSURE LAMINATES

BACKGROUND OF THE INVENTION

Decorative laminates are well known articles of commerce which have been produced for many years. They can be used for a wide variety of table, counter, desk top and wall surfaces.

Conventional high-pressure decorative laminates are usually composed of a laminated supporting core, an absorbent print-barrier sheet and an overlay-protective sheet. The core is conventionally composed of a plurality of inexpensive kraft paper sheets, impregnated with a phenolic resin. The print sheet, which is placed on top of the core, is primarily used to supply the decorative effect to the laminate, be it a wood grain, marble, solid color or patterned effect.

The print sheet is conventionally made of expensive, smooth-surfaced, highly absorbent, heavy basis weight, pure grade regenerated alpha cellulose paper, loaded with costly fillers and impregnated with melamine-formaldehyde resin. The print sheet secondarily acts to absorb some of the phenolic resin leakage from the core during laminating. The print sheet also acts as a barrier sheet, where the melamine resin in the middle of the sheet, blocks further bleeding of phenolic resin from the core layer during high pressure laminating, and imparts color stability. The fillers impart an opacifying effect, to mask the dark color of the phenolic resin in the kraft paper core.

In the case of a multicolored wood grain laminate, having, for example, a distressed or weatherbeaten effect, three or perhaps four separate printings on the print sheet may be required. For each variation in shade, a different color print sheet may be necessary. This leads to necessitating a large stock of print sheet inventory, to the point that it has become an unmanageable burden on the laminating industry.

Because of the wear to which horizontal surfaces or outdoor vertical surfaces are subjected, a protective overlay sheet is conventionally applied over the print sheet. The overlay is conventionally made of pure grade paper, impregnated with a very high loading of melamine-formaldehyde resin. Because of the interface between the overlay and patterned print sheet, the decorative pattern, especially of fine wood grains, is not always as distinct as may be desired.

Arledter, in U.S. Pat. No. 2,816,851, attempted to solve pattern sharpness and phenolic resin bleeding problems, by printing the reverse side of an overlay sheet with a decorative design, such as a wood grain pattern. There, the overlay sheet had a special construction, and was impregnated with a melamine-formaldehyde resin. The overlay was used in conjunction with an unprinted, print sheet barrier paper, loaded with opacifying fillers, and impregnated with melamine-formaldehyde resin. The overlay sheet contained 50 weight percent pure grade cellulose fibers and 50 weight percent of a combination of rayon and glass fibers. This construction still retained the expensive filled barrier, required an expensive combination overlay, and did not solve inventory problems.

What is needed in the industry is a method of making a high pressure, patterned, decorative laminate, using an inexpensive overlay-print barrier sheet combination in conjunction with a minimal amount of expensive paper and filler, and utilizing at most a two resin system.

SUMMARY OF THE INVENTION

The above need is met by providing a heat and pressure consolidated decorative laminate, comprising in superimposed relationship: kraft paper core sheets impregnated with a suitable inexpensive, heat resistant plastic resin; at least one unfilled kraft paper barrier sheet impregnated with at least 30 weight percent of an aminotriazine-aldehyde, urea-aldehyde, thiourea-aldehyde, mixtures of these resins, or unsaturated polyester resin; and an unfilled top paper sheet, consisting essentially of pure grade cellulose fibers, impregnated with the same resins that can be used in the barrier sheet. This top sheet has a complete design printed on the under surface, and has an opacifying and coloring stain or ink covering the printed design, and disposed next to the barrier sheet.

This construction provides sharp pattern details, eliminates the need of an expensive combination of fibers in the overlay, and completely eliminates the expensive, filled, alpha cellulose print sheet, by substituting unfilled resin impregnated kraft paper at about 1/5 the cost. This construction also solves opacifying and inventory problems, by use of an ink impregnant layer as a last coating on the underside of the overlay sheet.

BRIEF DESCRIPTION OF THE DRAWINGS

For a better understanding of the invention, reference may be made to the preferred embodiments, exemplary of the invention, shown in the accompanying drawings in which.

DESCRIPTION OF THE PREFERRED EMBODIMENTS

Figure 1:
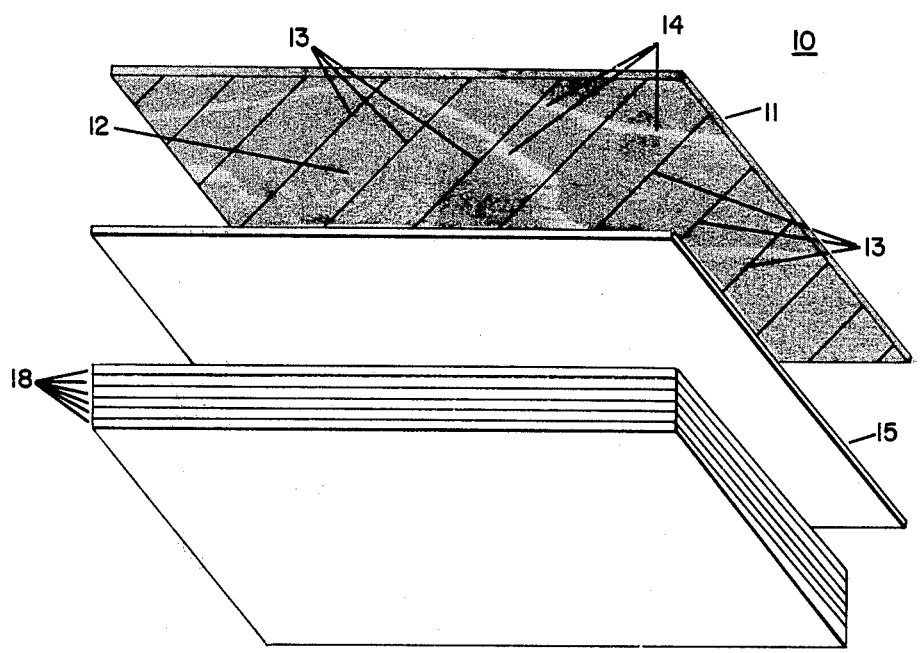
FIG. 1 shows, in three dimensional superimposed relationship, the printed ink coated overlay, resin impregnated barrier sheet and core layers, comprising one embodiment of the laminate of this invention.

Referring now to the drawings, FIG. 1 shows one embodiment of the decorative laminate lay-up 10 of this invention. The laminate lay-up, comprises a resin impregnated, reverse printed overlay protective sheet 11; having, for example, a knotted wood grain pattern 12 printed on its reverse or bottom side. The protective sheet also has a coating of stain or ink 13 covering the pattern, and clearly showing through the top side of the overlay, in a contrasting color, at points 14. The resin impregnated kraft paper barrier sheet is shown as 15, and the kraft paper core sheets, impregnated with heat resistant resin, are shown as 18.

This laminate lay-up is placed between press surfaces, with a release sheet imposed between the lay-up and the press surfaces. Heat and pressure are applied to consolidate the lay-up to a unitary, bonded, decorative structure. An embossing sheet of, for example, patterned thin aluminum, or resin impregnated paper-backed aluminum foil, may also be used on top of the printed overlay, to emboss wood grain indentations conforming to the pattern of the overlay.

The resins used in the overlay are thermosetting resins which will not undergo any noticeable deterioraton in color, such as darkening, under laminating conditions. The melamine-formaldehyde, urea-formaldehyde, thiourea-formaldehyde or unsaturated polyester resin preferably used, is transparent after lamination, allowing sharp pattern show-through.

The rigidity imparting, supporting fiber core, will preferably consist of kraft fiber paper, uncreped, creped, or in mixtures: although cotton linters paper, or cotton or linen cloth can also be used. The fibrous sheets making up this support layer will each generally range in thickness from about 0.001 to 0.025 inch, and preferably between about 0.002 to 0.015 inch. Generally, 5 to 15 sheets will be used in the core structure.

The preferred kraft fiber support sheets, should have between about 30 to 150 lb. basis weight, i.e., contain between about 30 to 150 lb. of paper per 3000 sq. ft. of sheet, to provide sufficient bulk. The support layer must be thick enough to tolerate the heat input during the laminating process. Generally, the core layer will be between about 0.01 to 0.25 inch thick. The core layer is impregnated with heat resistant resin that will withstand temperatures of about 120° to 175° C, such as epoxy (polyglicidyl ether), but preferably an inexpensive type phenolic resin.

The barrier layer will consist of at least one kraft fiber paper, in creped or uncreped form, and range in thickness from about 0.001 to 0.025 inch, and preferably between about 0.002 to 0.015 inch. It should have between about 30 to 125 lb. basis weight, and preferably about 60 to 110 lb. basis weight. Above 125 lb. basis weight, the paper will be too coarse and may affect the pattern. Below 30 lb. basis weight, the paper will not have sufficient absorbent effect to help control core resin flow. This barrier layer will not contain any filler particles, and will preferably be a single sheet. The unfilled barrier sheet will contain an amount of resin effective to prevent phenolic or epoxy resin bleed through from the core during laminating. It may also be colored or dyed, to further help eliminate show-through.

The overlay sheet will consist essentially of high grade regenerated or alpha cellulose fibers, with only minimal amounts of kraft paper extending fibers. It will not contain fillers and will not contain any expensive nylon, rayon or glass fibers. This sheet will range in thickness from about 0.001 to 0.015 inch, and preferably between about 0.001 to 0.010 inch. It should have between about 10 to 75 and preferably about 20 to 40 lb. basis weight.

Figure 2:
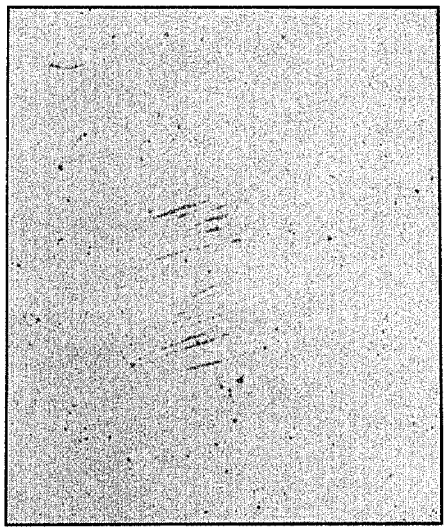
FIG. 2 shows a distressed pattern.
Figure 3:
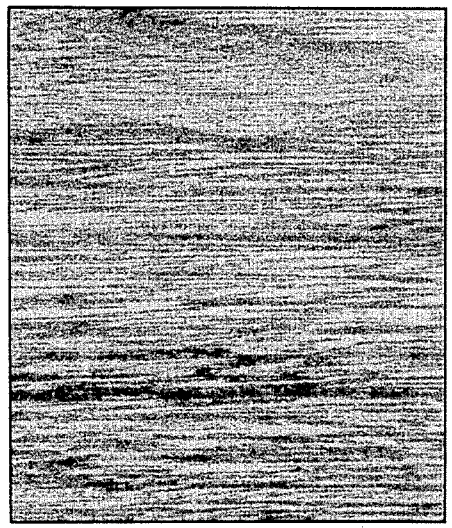
FIG. 3 shows a key stage wood grain pattern.

One side of the overlay sheet will be printed with a design, to provide, for example, a wood grained effect. To provide such a wood grained effect, a first printing, for example, of a distressed pattern may be printed on the overlay, as shown in FIG. 2. Then, the key stage wood grain pattern may be printed on top of the distressed, patterned overlay. Such a wood grain pattern is shown in FIG. 3, with the wood grain running horizontally.

Figure 4:
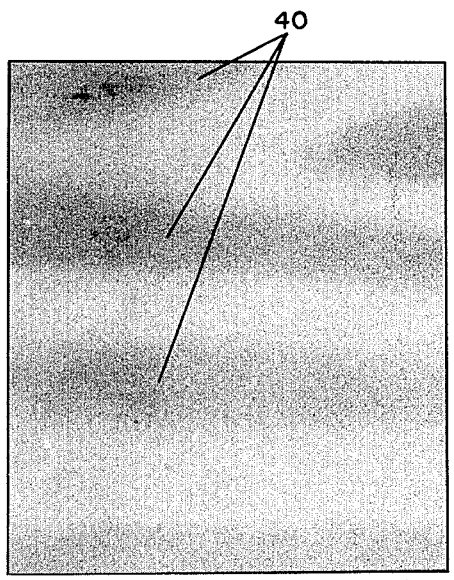
FIG. 4 shows a streaked toning stage pattern.

Both the distressed and key stage pattern will usually be black or gray. Then, a toning stage pattern of streaks, generally in a brown color, is printed on top of the distressed, wood grain printed overlay. Such a toning stage is shown in FIG. 4, where the areas 40 would have a tan or brown color. Any number of consecutive printings may be applied to provide the desired pattern, be it a wood grain, marble or geometrical pattern.

When the printing is finished, to provide the desired effect, the printed surface of the overlay is coated with a pigmented medium, such as a stain or colored ink, which is of a different shade of color than the rest of the pattern. For example, in the FIGS. 2 to 4 above, the final ink coating may be tan, if the toning stage pattern is dark brown, and the distressing and wood grain are black, so that the ink contrasts with the other colors used, and does not make the overlay appear to be a solid color.

An amount of stain or ink will be applied to provide a coating saturating the underside of the overlay, on top of the printing, effective to provide an opacifying effect, i.e., mask the color of the phenolic resin and kraft paper core, without harming bonding properties of the laminate. The ink or stain chosen can be one of a wide variety used and well known in the engraving and printing industry. It must, of course, be compatible with high pressure bonding techniques and the aminotriazine-aldehyde resin, or other resin used in the overlay, and not run or be degraded by it to any appreciable extent.

Such inks or stains may generally constitute about 2 to 80 weight percent colored pigment, disposed in a suitable resin and/or solvent carrier medium. It can be applied by suitable single or multiple coating techniques, such as hand painting, air brush techniques, spraying, roller coating, knife coating, or by using standard printing and engraving techniques. It will be applied in the range of about 0.05 to 1.20 gram/sq. ft., preferably about 0.1 to 0.6 gram/sq. ft., of overlay surface. With less than about 0.05 gram/sq. ft. of pigmented coating, phenolic show-through will begin to cloud details of the printed pattern. With over about 1.20 gram/sq. ft. of pigmented coating, good bonding of the laminate may be affected. Useful inks would include, among many others, epoxy, diallyl phthalate or melamine-formaldehyde resin based inks, containing about 2 to 80 weight percent pigment and 10 to 40 weight percent solvent, such as, for example, methyl ethyl ketone, alcohol, water and ethyl cellosolve among others.

Therefore, a wide range of colors and shades can be effected by simply using different coating inks, rather than changing the color of a print sheet, as has been the practice. A variety of unusual effects can be obtained by modifying the color of the printed pattern by use of the ink coating.

Figure 5:
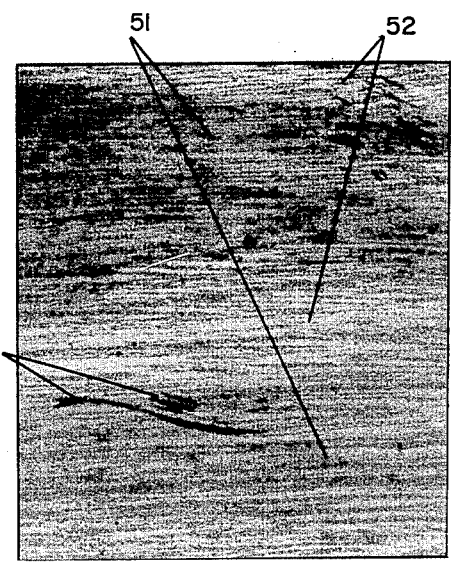
FIG. 5 shows a composite printed pattern containing the printings of distressing, wood grain and toning.

FIG. 5 shows a final reverse printed overlay sheet, which is made by a printing process similar to that described hereinabove. The distressing or weather-beaten effect is seen at points 50. The woodgrain is evident. The toning is shown at points 51. This FIGURE shows the underside of the overlay sheet. This side will then be coated with an effective amount of a suitable stain or printing ink. The printing ink may modify the toning at points 51, and will show through to the top overlay side at untoned, generally uncolored areas 52. The ink of course will be of a contrasting color. The grain or color of the overlay may be easily selected to imitate a certain wood, such as walnut, teak, mahogany, etc.

This printed and ink coated side of the overlay, will be disposed next to the impregnated kraft paper barrier sheet in the laminate stack-up. This combination provides clarity and sharpness of pattern, masking of the color of the core sheets and core resin, and prevents bleed through of the core resin; while eliminating a large proportion of expensive materials, dramatically increasing color versatility, and maintaining sufficient abrasion resistance for most surfaces.

Release sheets can be used between the laminate lay-up and the press surface. These may be any one of a variety of commercially available materials, for example, non-adherable paper, such as glassine or parchment paper, or non-adherable aluminum foil. Also suitable are papers treated with polyfluorocarbons or silicone oils. One of the preferred release sheets is a commercially available aluminum foil onto the back of which is mounted a thin sheet of paper. In using such a release sheet, the metal surface of the sheet would be placed face down on the laminate assembly with the paper side toward the press plate. The foil surface may also have a coating of a release agent, such as, for example, stearic acid, zinc stearate or calcium stearate.

The overlay sheet and barrier sheet will be impregnated with a thermosetting resin, preferably an aminotriazine-aldehyde resin, such as melamine-formaldehyde. These conventional thermosetting aminotriazine-aldehyde resins are synthetic resins wherein one or more aminotriazines, containing at least two amidogen groups, each having at least one aldehyde-reactable hydrogen atom attached to the amidogen nitrogen atom, e.g., melamine, have been reacted with an aldehyde, such as formaldehyde, to yield a potentially thermoset resinous condensate.

Melamine is the preferred aminotriazine reactant for preparing the heat-curable or potentially heat-curable partially polymerized aminotriazine-aldehyde resinous reaction products, but other aminotriazines, e.g., mono-, di- and tri-substituted melamines, such as the mono-, di- and tri-methylmelamines, and the like; guanamines, such as formoguanamine, acetoguanamine, benzoguanamine, and the like, as well as mixtures of aminotriazines, may also be utilized as reactants. Similarly, formaldehyde, either as such or as an aqueous solution, is the preferred aldehyde reactant, but other aldehydes, e.g., acetaldehyde, propionaldehyde, butyraldehyde, benzaldehyde, and the like, or compounds engendering aldehydes, e.g., paraformaldehyde, hexamethylenetetramine, and the like, may also be employed. Usually the mole ratio of aldehyde: aminotriazine will be between about 1.5:1 to 4:1.

If desired, the thermosetting aminotriazinealdehyde resin may be modified by the addition thereto of effective amounts of plasticizers such as $\alpha$-alkyl-D-glucosides, e.g., $\alpha$-methyl-D-glucoside, glycols, guanamines, or methylol derivatives of sulfonamides, e.g., N-methylol-p-toluenesulfonamide. These materials help improve flexural properties of the cured laminate. Other methods of improving flexural properties and resin flow may be employed, such as the using of a buffering flow promoter, for example, effective amounts of guanidine carbonate or diguanidine carbonate, i.e., about 0.025 to 5% by weight based on resin weight; a low aldehyde to aminotriazine ratio, i.e., a mole ratio of formaldehyde:melamine of between about 1.1:1 to 1.8:1; and a high pH, i.e., between about 8 to 11, as disclosed in U.S. Pat. No. 2,633,459.

In addition, the thermosetting aminotriazine-aldehyde resin may also contain effective amounts of commonly employed curing catalysts, such as phosphoric acid, phthalic acid, p-toluenesulfonic acid, mixtures of alkyl alkylol tertiary amines, e.g., diethylethanolamine, and acids, e.g., acetic acid, and the like. It may also contain effective amounts of acrylic resin, such as methyl methacrylate, ethyl methacrylate and the like to increase roughness upon cure.

Other aminoplastics, such as urea-aldehyde and thiourea-aldehyde resins, as well as unsaturated polyester resins, can be used to impregnate the overlay and barrier sheets, and complete details on their production can be found in *Plastics Materials* by Brydson (1966), chapters 20 and 21. Formaldehyde is the preferred aldehyde for the above aminoplastics, but other aldehydes may be used as described hereinabove for the melamine resins. The above-mentioned plasticizers, flow promoters, catalysts and materials to improve toughness upon cure can also be used in effective amounts with the urea-aldehyde and thioureaaldehyde or polyester resins; a particularly effective material for improving toughness of the polyesters being diallyl phthalate. It is to be understood that the terms aminotriazine-aldehyde, urea-aldehyde, thiourea-aldehyde and unsaturated polyester could include effective amounts of the above described well known plasticizers, flow promoters, catalysts and toughening agents. The aminotriazine-aldehyde, urea-aldehyde and thiourea-aldehyde can also be used in mixtures.

The kraft paper core will be preferably impregnated with a phenolic resin. These resins are conventionally obtained by reacting a phenolic substance such as phenol itself, substituted phenols, e.g., alkyl phenols such as cresols, xylenols, tertiary alkyl phenols, and the like, or mixtures of such phenolic substances with an aldehyde such as formaldehyde, acetaldehyde, propionaldehyde, benzaldehyde, furfural, and the like, or with mixtures of such aldehydes, either alone or in the presence of other aldehyde-reactable substances such as urea, thiourea, substituted ureas and thioureas, aminotriazines, and the like.

The aminotriazine-aldehyde resins used to impregnate the overlay and barrier sheets are well known in the art and reference may be made to U.S. Pat. No. 3,392,092 for exhaustive details on their production. Similarly, complete details on the phenolic resins used to impregnate the core sheet can be found in U.S. Pat. Nos. 2,205,427; 2,315,087; 2,328,592 and 2,383,430. Epoxy resins can be used to impregnate the core and complete details on their production can be found in *The Handbook of Epoxy Resins* by Lee and Neville.

The overlay sheet, barrier sheet and core sheets are impregnated using standard techniques. The overlay paper will be impregnated with a solution of aminotriazine-aldehyde resin to give a resin content between about 50 to 80 percent by weight, and then dried to a stage where the volatile content is between about 2 to 10 weight percent.

The barrier sheet will be impregnated with a solution of aminotriazine-aldehyde resin to give a resin content of at least 30 weight percent and preferably between 45 and 75 percent by weight, based on the total dry weight of the impregnated sheet, and then dried to a stage where the volatile content is between about 2 to 10 weight percent. It is essential to have at least 30 weight percent resin in the barrier sheet, so that the melamine can effectively act as a barrier to phenolic resin flow to the top of the laminate during high pressure consolidation.

The core layer sheets are impregnated with a solution of phenolic resin to give a resin content between 20 and 40 percent by weight, based on the total dry weight of the impregnated sheet, and then dried to a stage at which the resin is only partly cured and has a volatile content between about 4 to 15 weight percent. All of such dried or partially cured resins in the sheets are in the "B-stage"; in this stage they are flowable under heat and pressure during the high heat, high pressure lamination procedure.

High pressure laminating techniques are employed in preparing the laminates from the above described assembly of core stock layer of core sheets, barrier sheet and printed overlay sheet. Temperatures ranging from about 120° to about 175° C, and pressures ranging from about 600 to 2,000 p.s.i. are employed. The time required, at these temperatures, to effect a cure of the resinous components of the assembly will usually be from about 3 minutes to about 25 minutes. The resulting laminate is generally allowed to cool to between about 50°C–85° C before being removed from the press. The cooling step generally takes between about 30–90 minutes. Generally, the assembly will require a 15–45 minute warm-up period before the 120° to 175° C maximum curing temperatures are reached in the press. The entire cycle of warm-up, cure and cooling will vary between about 50 to 160 minutes.

EXAMPLE 1

A lay-up of a laminating assembly was prepared as described below: A roll of 115-lb. basis weight kraft paper, 0.01 inch thick, was dip-treated with a solution of phenol formaldehyde resin, to give a resin content of about 35 weight percent, and then dried to a stage at which the resin was only partly cured, i.e., "B-staged", and had a volatile content of about 7 weight percent. Equal size, partly cured, impregnated core sheets, 12 × 18 inches were cut from the roll and assembled in a stack of seven sheets to form a core stock layer.

A release sheet was placed on the bottom stainless steel plate press surface, followed by the core stock layer. A resin impregnated, partly cured, 99-lb. basis weight, filler free, kraft paper barrier sheet, 0.006 inch thick before impregnation, was placed on the core stock layer; followed by a resin impregnated, partly cured, 0.002 inch thick 27-lb. basis weight, filler free, reverse printed overlay sheet. The barrier and overlay comprised a 12 × 18 inch sheet of kraft and alpha cellulose paper, respectively, impregnated with melamine-formaldehyde resin. The melamine-formaldehyde resin content of the barrier and overlay sheets prior to drying was about 50 and 65 weight percent, respectively, and after curing they had a volatile content of about 7 weight percent each. This provided a core-barrier-overlay lay-up. A release sheet was then superimposed on the overlay sheet. The release sheets were an aluminum-paper combination with the aluminum facing the lay-up.

The overlay sheet was reverse printed as described in the specification hereinabove and illustrated in FIGS. 2 to 5. First, alpha-cellulose overlay paper was printed, using regular grey printing ink, about 50 weight percent pigment in a carrier medium, (sold commercially by Borden Co. under the trade name Cilco Ink), with a distressed pattern, such as that shown in FIG. 2. Then, a wood grain pattern, such as that shown in FIG. 3, was printed, using a regular grey printing ink, on top of the distressed printing.

Next, a tan streaked toning stage, such as that shown in FIG. 4, was printed, using regular tan printing ink, on top of the distressed wood grain printing, to provide a pattern similar to that shown in FIG. 5. In all cases 7 inch diameter stainless steel engraved rollers were used. Finally, a coating of dark brown printing ink, about 50 wt. % pigment in an ethyl cellosolve carrier medium (sold commercially by Borden Co. under the trade name Cilco Ink) was printed in the range of about 0.05 to 0.60 gram/sq. ft. on top of the pattern, using a plain roller. The pattern on the bottom side of the overlay resembled walnut wood, with tan and dark brown in color gradations matching the wood grain. It is essential to use over about 30 wt. % melamine in the barrier, and over about 0.05 gram/sq. ft. ink coating to provide a commercially useful product with no bleed through.

The press was then closed against the laminating assembly which was molded at 1000 psi and about 155° C. The assembly was heated in the press for a total of about 35 minutes, i.e., about 20 minutes was required for warm-up after placing the laminating assembly in the press and 15 minutes was required at the maximum internal temperature. Then the assembly was allowed to cool for about 45 minutes until the assembly reached a temperature of 70° to 80° C, after which the laminating assembly was taken from the press and the release sheets removed.

A very finely detailed, consolidated, wood colored, strongly bonded decorative laminate was produced without any phenolic resin bleed through or showthrough. In the same fashion, a 50 × 98 inch lay-up was also laminated with similar excellent results. Thus, expensive, filled alpha-cellulose print sheets were eliminated and a wide variety of color combinations could be achieved with minimal inventory of paper and inks.

The melamine formaldehyde and phenol formaldehyde impregnating resins used above to impregnate the overlay, print and core stock papers were prepared as follows: To 1,620 lb. (20 moles) of a 37 percent formaldehyde solution with a pH adjusted to about 7.5 with sodium hydroxide was added 1,260 lb. (10 moles) of recrystallized melamine. The mixture was heated to reflux and then cooled to 60°–65° C. Then, the following materials were added in order: 200 lb. of ethyl alcohol, 140 lb. of p-toluene sulfonamide and 186 lb. of methylglucoside. Mixing was continued to complete solution. Finally, 734 lbs. of water was added.

To 940 lbs. (10 moles) of molten phenol was added 1,012 lbs. (12.5 moles) of 37 percent formaldehyde solution. To this was added a sodium hydroxide solution containing 15 lbs. 0.375 mole) of sodium hydroxide flakes dissolved in 30 lbs. of water. The mixture was reacted at 98° C. reflux and then diluted with methyl alcohol.

As described hereinabove, other resinous material impregnants could be used, in the same manner as in this Example, with equally good results; for example, epoxy, though more costly, could be substituted for phenolic resins in the core, and, for example, melamine-formaldehyde-urea, ureaformaldehyde-acrylic, urea-formaldehyde, thiourea-formaldehyde, unsaturated polyester, etc. could be substituted for the melamine-formaldehyde resins in the barrier and overlay sheets.

We claim:

1. A method of making a heat and pressure consolidated decorative laminate comprising the steps of:
   A. preparing a core layer comprising a plurality of fibrous sheets impregnated with a resinous material; and then
   B. placing on top of the core at least one unfilled kraft paper barrier sheet impregnated with at least 30 weight percent of a resin selected from the group consisting of aminotriazine-aldehyde resin, urea-aldehyde resin, thiourea-aldehyde resin, mixtures thereof, and unsaturated polyester resin; and then C. placing on top of the barrier sheet an unfilled, protective, fibrous overlay sheet selected from the group consisting of alpha cellulose and regenerated cellulose paper impregnated with a resin selected from the group consisting of aminotriazine-aldehyde resin, urea-aldehyde resin, thiourea-aldehyde resin, mixtures thereof, and unsaturated polyester resin; said protective sheet having a design printed on the surface facing the barrier sheet, said design having applied thereto a coating of pigmented material, said pigmented material, containing about 2 to 80 weight percent colored pigment dispersed in a carrier medium, and D. heat and pressure consolidating the sheets into a unitary, bonded laminate; wherein the barrier sheet is effective to prevent core resin bleed through to the overlay sheet, and the pigmented material applied to coat the protective sheet design is effective to mask the color of the barrier and core sheets.

2. The method of claim 1, wherein the core layer consists of kraft paper sheets impregnated with a resin selected from the group consisting of phenolic resin and epoxy resin, and the sheets are consolidated at temperatures of from about 120° to about 175° C and pressures of from about 600 psi to about 2,000 psi.

3. The method of claim 2, wherein the core layer is impregnated with about 20 to 40 weight percent phenolic resin and dried to a volatile content of about 4 to 15 weight percent, the barrier sheet is impregnated with about 30 to 75 weight percent resin and dried to a volatile content of about 2 to 10 weight percent, and the printed overlay sheet is impregnated with about 50 to 80 weight percent resin and dried to a volatile content of about 2 to 10 weight percent.

4. The method of claim 2, wherein the core layer is impregnated with phenolic resin, the barrier sheet is impregnated with aminotriazine-aldehyde resin and the printed overlay is impregnated with aminotriazine-aldehyde resin.

5. The method of claim 4, wherein the pigmented material covering the printed design on the overlay sheet is applied in the range of about 0.05 gram/sq. ft. to about 1.20 gram/sq. ft. of overlay surface, and the barrier sheet has a basis weight of between about 30 lb. to about 125 lb. per 3000 sq. ft. sheet.

6. The method of claim 5, wherein the design printed on the overlay sheet is a colored wood grain pattern and the pigmented material covering it has a contrasting color.

7. The method of claim 6, wherein an embossing sheet is placed on top of the protective overlay before step (D) to emboss good grain indentations conforming to the pattern of the overlay.

8. The method of claim 6, wherein the aminotriazinealdehyde resin is a melamine-formaldehyde resin having a mole ratio of formaldehyde: melamine of between about 1.1:1 to 1.8:1, and is buffered with a flow promoter selected from the group consisting of guanidine carbonate and diguanidine carbonate to provide a pH of between about 8 to 11.

9. A method of making a heat and pressure consolidated high pressure decorative laminate comprising the steps of:

A. preparing a core layer comprising a plurality of kraft paper sheets impregnated with a phenolic resin; and then B. placing on top of the core at least one kraft paper barrier sheet, containing no filler particles and having a basis of weight of between about 30 lb. to about 125 lb. per 3000 sq. ft. of sheet, impregnated with about 30 to 75 weight percent of an aminotriazine-aldehyde resin; and then C. placing on top of the barrier sheet a protective, fibrous overlay sheet selected from the group consisting of alpha cellulose and regenerated cellulose paper, containing no filler particles and impregnated with an aminotriazine-aldehyde resin; said protective sheet having a design printed on the surface facing the barrier sheet, said design having applied thereto a coating of pigmented material in the range of about 0.05 gram/sq. ft. to about 1.20 gram/sq. ft. of overlay surface, said pigmented material containing about 2 to 80 weight percent pigment of a color contrasting with the printed design dispersed in a carrier medium, and D. heat and pressure consolidating the sheets into a unitary, bonded laminate; wherein the barrier sheet is effective to prevent phenolic resin bleed through to the overlay sheet, and the pigmented material applied to coat the protective sheet design is effective to mask the color of the barrier and core sheets.

10. The method of claim 9, wherein the aminotriazine-aldehyde resin is a melamine-formaldehyde resin, the overlay is a fibrous sheet selected from the group consisting of alpha cellulose and regenerated cellulose paper, the design printed on the overlay sheet is a colored wood grain pattern and the sheets are consolidated at temperatures from about 120° to about 175° C and pressures from about 600 psi to about 2,000 psi.

* * * * *